(12) United States Patent
Zhang

(10) Patent No.: US 11,496,369 B2
(45) Date of Patent: Nov. 8, 2022

(54) NETWORK TOPOLOGY DISCOVERY IN SUBSTATION

(71) Applicant: ABB Schweiz AG, Baden (CH)

(72) Inventor: Qi Zhang, Fujian (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/415,185

(22) PCT Filed: May 22, 2019

(86) PCT No.: PCT/CN2019/087952
§ 371 (c)(1),
(2) Date: Jun. 17, 2021

(87) PCT Pub. No.: WO2020/232667
PCT Pub. Date: Nov. 26, 2020

(65) Prior Publication Data
US 2022/0060383 A1   Feb. 24, 2022

(51) Int. Cl.
*G06F 15/173* (2006.01)
*H04L 41/12* (2022.01)
(Continued)

(52) U.S. Cl.
CPC .......... *H04L 41/12* (2013.01); *H04L 41/0213* (2013.01); *H04L 41/0893* (2013.01); *H04L 41/22* (2013.01)

(58) Field of Classification Search
CPC . H04L 41/12; H04L 41/0213; H04L 41/0893; H04L 41/22
See application file for complete search history.

(56) References Cited

U.S. PATENT DOCUMENTS

| 6,504,841 B1 | 1/2003 | Larson et al. |
| 2004/0264484 A1* | 12/2004 | Kui ..................... H04L 43/0817 370/402 |

(Continued)

FOREIGN PATENT DOCUMENTS

| CN | 103762591 A | 4/2014 |
| CN | 103856579 A | 6/2014 |

(Continued)

OTHER PUBLICATIONS

Chinese National Intellectual Property Administration, International Search Report in International Patent Application No. PCT/CN2019/087952, 4 pp. (dated Feb. 14, 2020).

(Continued)

*Primary Examiner* — Wing F Chan
*Assistant Examiner* — Joseph R Maniwang
(74) *Attorney, Agent, or Firm* — Leydig, Voit & Mayer, Ltd.

(57) ABSTRACT

A method includes determining a plurality of devices in a networked state in a substation system, the plurality of devices including host computers, switches, and end devices; determining an inter-device connection relationship of the plurality of devices; and generating a layout view for the plurality of devices based on the inter-device connection relationship. The layout view includes a host computer layer including representations of the host computers. A switch layer includes bus lines representing the switches, and an end device layer includes representations of the end devices, each of the host computer layer and the end device layer being connected to the switch layer.

14 Claims, 5 Drawing Sheets

(51) Int. Cl.
  *H04L 41/0213* (2022.01)
  *H04L 41/0893* (2022.01)
  *H04L 41/22* (2022.01)

(56) References Cited

U.S. PATENT DOCUMENTS

| | | | | |
|---|---|---|---|---|
| 2013/0332529 A1* | 12/2013 | Orehawa | ............ | H04L 69/28 709/204 |
| 2014/0282021 A1* | 9/2014 | Dolezilek | ............ | H04L 41/12 715/735 |

FOREIGN PATENT DOCUMENTS

| | | |
|---|---|---|
| CN | 108429637 A | 8/2018 |
| WO | WO 2015/131463 A1 | 9/2015 |

OTHER PUBLICATIONS

Chinese National Intellectual Property Administration, Written Opinion in International Patent Application No. PCT/CN2019/087952, 5 pp. (dated Feb. 14, 2020).

* cited by examiner

NETWORK TOPOLOGY DISCOVERY IN SUBSTATION

CROSS-REFERENCE TO PRIOR APPLICATIONS

This application is a U.S. National Phase application under 35 U.S.C. § 371 of International Application No. PCT/CN2019/087952, filed on May 22, 2019. The International Application was published in English on Nov. 26, 2020 as WO/2020/232667 under PCT Article 21(2).

FIELD

Embodiments of the present disclosure generally relate to a power system, and in particular, to network topology discovery in a substation.

BACKGROUND

With the development of automation and intelligence in the power system, the amount of intelligent devices has augmented obviously. In addition, the algorithm and the logic of relay protections have evolved into an advanced level. As a consequence, the inter-device communication connection relationship has become more and more complex, especially when the redundancy communication configuration exists in the network of substation. The fault location and maintenance of devices will become troublesome in such situation.

The existing layout view of the devices in a substation becomes more and more complex and unclear with the augmentation of the devices and the connection relationship. For example, it is difficult to see the relationship of the connections between an end device and a switch or a host computer.

In addition, there is also a phenomenon named "device loss" in existing device discovery process. Some of the online devices cannot be automatically discovered and thus be called a device loss.

Accordingly, there is a need for an improvement in the network topology discovery in a substation that can solve at least a part of the above problems.

SUMMARY

In general, example embodiments of the present disclosure provide an approach for topology discovery in a substation.

In a first aspect, there is provided a method. The method comprises determining a plurality of devices in a networked state in a substation system, the plurality of devices comprising host computers, switches, and end devices; determining an inter-device connection relationship of the plurality of devices; and generating a layout view for the plurality of devices based on the inter-device connection relationship, the layout view comprising a host computer layer comprising representations of the host computers, a switch layer comprising bus lines representing the switches, and an end device layer comprising representations of the end devices, each of the host computer layer and the end device layer being connected to the switch layer.

In an embodiment, the end devices comprise at least one of an Intelligent Electronic Device (IED) and a time source device.

In an embodiment, determining the plurality of devices comprises: sending a first echo request to each network address in the substation system; in response to receiving a first response to the first echo request from a first device, sending a second echo request to each network address in a network segment comprising the first device; and in response to receiving a second response to the second echo request from a second device in the network segment, determining the second device as one of the plurality of devices.

In an embodiment, determining the plurality of devices further comprises: in response to failing to receiving the second response to the second echo request from a network address in the network segment, sending a socket client-server connecting request to the network address in the network segment; and in response to receiving a third response to the socket client-server connecting request from a third device, determining the third device as one of the plurality of devices.

In an embodiment, the method comprises obtaining identification information for the plurality of devices; and wherein the layout view comprises a representation of the identification information.

In an embodiment, the end devices comprise an Intelligent Electronic Device (IED) and a time source device, and wherein obtaining the identification information comprises: determining the identification information for the IED based on at least one of a Substation Configuration Description (SCD) file and an IEEE Medium Access Control (MAC) address table; and determining the identification information for the time source device based on at least one of a Simple Network Time Protocol (SNTP) protocol and an IEEE 1588 protocol.

In an embodiment, obtaining the identification information comprises: determining the identification information for the host computers and switches based on a Simple Network Management Protocol (SNMP) protocol.

In an embodiment, determining the inter-device connection relationship comprises: determining a first connection relationship among the switches in the plurality of devices as a part of the inter-device connection relationship; and determining, based on an IEEE Medium Access Control (MAC) address table and Address Forwarding Tables (AFTs) for the switches, a second connection relationship between the switches and remaining devices comprised in the plurality of devices as a further part of the inter-device connection relationship.

In an embodiment, determining the first connection relationship among the switches comprises: discovering one or more neighbor switches from the switches based on at least one of a discovery protocol and a Rapid Spanning Tree Protocol (RSTP) protocol; obtaining the AFTs for the switches based on a Simple Network Management Protocol (SNMP) protocol; and discovering a connection relationship among other switches based on the AFTs.

In an embodiment, generating the layout view comprises: determining a first plurality of permutations of the switches that minimizes a total length of connection lines between the switches and the end devices; determining, from the first plurality of permutations of the switches, a second plurality of permutations of the switches that minimizes a total length of connection lines between the switches based on the first permutation of the switches; and determining, from second plurality of permutations of the switches, a third permutation of the switches that minimizes a total length of connection lines between the host computers and the switches based on the second permutation of the switches; and generating the layout view based on the third permutation of the switches.

In an embodiment, generating the layout view comprises: in response to a connection line for a first end device of the end devices traversing through at least one of other devices, moving the representation of the first end device along the bus line such that the connection line does not traverse any of other devices.

In a second aspect, there is provided a computing device. The computing device comprises a processor; and a computer-readable storage medium storing instructions which, when executed by the processor, cause the processor to perform the method of the first aspect.

In a third aspect, there is provided a substation. The substation comprises host computers; switches coupled to the host computers; end devices coupled to the switches; and the computing device of the second aspect.

In a fourth aspect, there is provided a computer-readable storage medium storing instructions which, when executed by a computing device, cause the computing device to perform the method of the first aspect.

It is to be understood that the Summary is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, in which.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
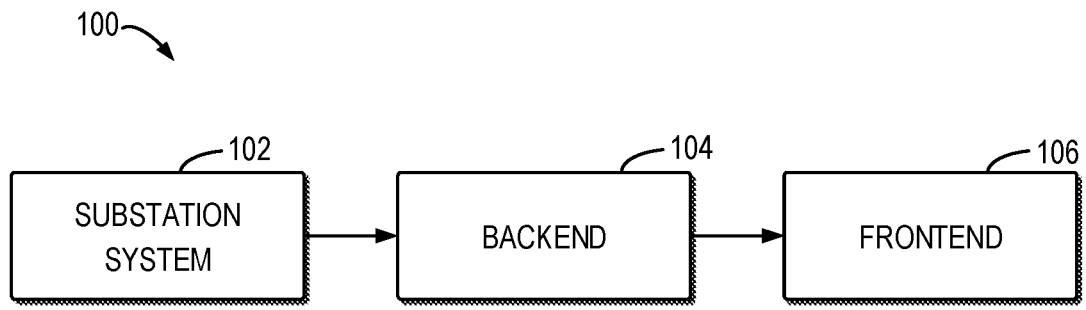
FIG. 1 is a block diagram schematically illustrating a system in which embodiments of the present disclosure can be implemented.

FIG. 1 is a block diagram illustrating a system 100 in which embodiments of the present disclosure can be implemented. The system 100 includes a substation system 102, also referred to as a network of substation. The substation system 102 includes host computers, switches, and end devices or final devices such as Intelligent Electronic Devices (IEDs) and time source devices. The system 100 further includes a backend 104 configured to perform topology discovery and generate a layout view in accordance with embodiments of the present disclosure. The system 100 can further include a frontend 106 configured to output the layout view and interact with user input in accordance with embodiments of the present disclosure.

Figure 2:
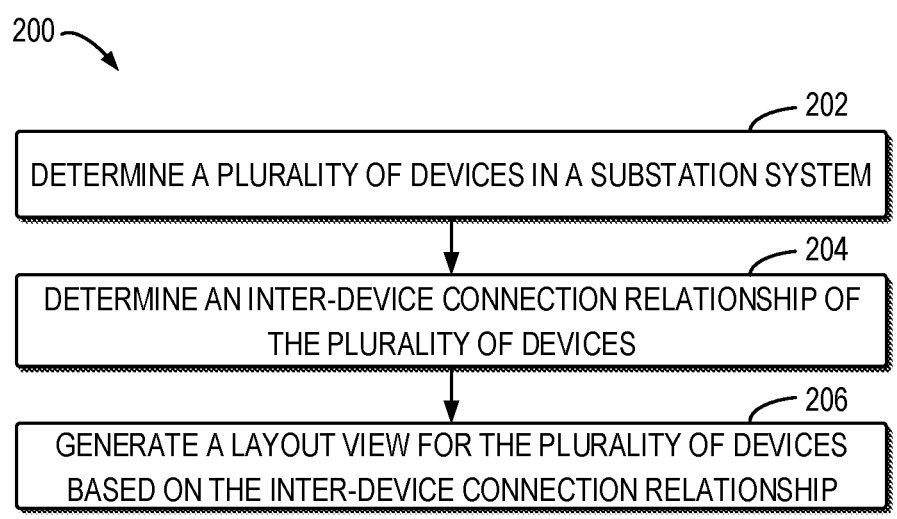
FIG. 2 is a flowchart illustrating a method of topology discovery in a substation in accordance with embodiments of the present disclosure.

FIG. 2 is a flowchart illustrating a method 200 of topology discovery in a substation in accordance with some embodiments of the present disclosure. The method 200 can be implemented at the backend 104 and optionally the frontend 106. The method 200 will now be described with reference to the system 100, but can also be implemented in any other suitable system.

At block 202, the system can determine a plurality of devices in a networked state in a substation system. The plurality of devices comprising host computers, switches, and end devices such as IEDs and time source devices. This can also be referred as a device discovery process.

In some embodiment, discovery of network devices may include scanning IP addresses and generating the IP-MAC addresses corresponding table. When scanning IP addresses, the host computer can firstly send continuously "ping" requests to the network with each possible configured IP address in the range of the subnet mask by using the Internet Control Message Protocol (ICMP) protocol. If a certain online device responds to this request, the host computer will receive a response packet message and then the system will know that the status of this device is online and collect its value of IP address.

When generating the IP-MAC addresses corresponding table after collecting the IP addresses of online devices, the system can obtain the MAC address of online device and generate the IP-MAC addresses corresponding table with assistance of querying the ARP IP-MAC addresses table of the host computers by using the ARP protocol.

The inventors have identified a number of problems with the existing method of device discovery, which will be described below.

1. The method of scanning the IP addresses only supports "Ping" request by using the ICMP protocol. Therefore, if some specific devices disable the function of response of the "Ping" request considering the security, the system cannot discover these specific devices. It appears the phenomenon of "device loss".

2. The second issue appears depending on the amount of IP addresses which need to be scanned. If the amount of the IP addresses is less, the process of scanning is very short and there is no problem, for example, if the subnet mask is configured with 255.255.255.0, only there are 254 IP addresses need to be scanned. If the amount of the IP addresses is very large, for example, there exists 65,334 IP addresses need to be scanned when the subnetwork mask is configured with 255.255.0.0, the current mainstream systems have no ability to avoid a great issue: long time-consuming and devices discovery loss.

The test indicates that if the subnet mask is configured with 255.255.0.0, the time-consuming of the IP scanning process is more than 4 hours, and meanwhile it appears the phenomenon of the "devices loss".

The phenomenon of "devices loss" is that some certain devices are alive in the network in actual, but the devices discovery system cannot find out them. There are 2 reasons as below:

a. The process of "ping" IP address in asynchronous ways using multi-thread brings about the threading blocking and this issue causes the relay packets have been lost.

b. The default lifetime of the dynamic ARP IP-MAC address table in the host computer is just 2 minutes. That means if the period of "Ping" each time has been beyond the 2 minutes, the obtained online IP addresses cannot find out the corresponding MAC address in the ARP IP-MAC address table.

3. Some similar systems use multi-thread to send asynchronously the "ping" requests to solve the issue of long time-consuming. However, if the regulation of the timeout value and the pause time is not done well, the phenomenon of "device loss" will always appear. For the reason that if these both times are set too short, the thread blocking will cause ping reply packet loss, and misguide cause "devices loss" and meanwhile the CPU and memory occupancy is very high. Inversely, if these both times are set too long, the period of scanning and collecting IP addresses have risk to exceed the default lifetime of the dynamic ARP IP-MAC address table in the host computer, and cause the "devices loss" and meanwhile the time-consuming is also prolonged.

To solve above issues, a method for device discovery is proposed, that is, rapid search method. In the method, the system may send a first echo request to each network address in the substation system. For example, the echo request may be a ping request. In this way, the system can determine the network segments that are responsive to echo requests and then narrow down the range for device discovery.

If a first response to the first echo request is received from a first device, the system can send a second echo request to each network address in a network segment comprising the first device.

If a second response to the second echo request is received from a second device in the network segment, the system can determine the second device as one of the plurality of devices.

In addition, if the second response to the second echo request is not received from a network address in the network segment, the system can send a socket client-server connecting request to the network address in the network segment. In this way, the system can discover devices with the echo request disabled. For example, if a third response to the socket client-server connecting request is received from a third device, determining the third device as one of the plurality of devices.

Figure 3A:
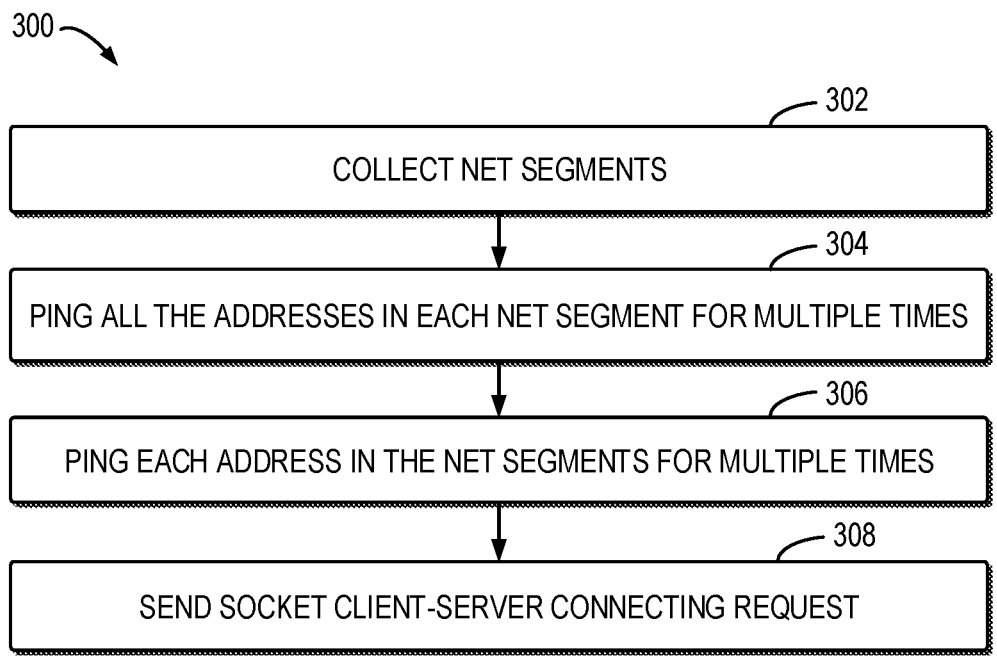
FIG. 3A is a flowchart illustrating a method of device discovery in a substation in accordance with embodiments of the present disclosure.

FIG. 3A is a flowchart illustrating such a method 300 of scanning network addresses such as IP addresses.

At block 302, the system can collect net segments that are responsive to echo requests. For example, the system will scan each possible configured IP address in the range of the current subnet mask by "ping" one or more times, for example, 5 times. This phase focus on collecting the net segments with the purpose of narrowing the range of IP addresses need be scanned. For example, if the subnet mask is "255.255.0.0", in total, there are 65,334 IP addresses that need be scanned. However, perhaps all the real IP addresses of the online devices are in the range from 10.10.110.0 to 10.10.114.254. Therefore, the system will collect the net segments only from 10.10.110.XX to 10.10.114.XX.

At block 304, the system can scan each of the collected net segments for one or more rounds, for example, at most 5 rounds. More specifically during each round, the system will send asynchronously "ping" request from sub IP address 1 to 255 by using the multi-thread in each of the net segments. In order to optimize the overall time of the IP scan, the system will record the IP address as soon as it responses the "Ping" request, and this IP will not be "Pinged" again in the next round.

Between the each loop, the system always monitors the status of occupancy of the thread pool, if the thread pool approach to full-load, the system will be into the status of waiting until the resource of thread pool is released sufficiently.

At block 306, the system can ping each address in the collected net segments for multiple times in order to avoid the appearance of the phenomenon of device loss. For example, the system will continuously ping a single IP address by 5 times in a round, and in total 256 rounds.

At block 308, the system will send the "socket client-server" connecting requests to the IP addresses which are no response in the collected net segments by using the TCP protocol in order to discover some specific devices which disable the response of "Ping" request.

During each round, after the system collected the IP addresses of online devices, it will read the ARP IP-MAC table in the host computers in order to get the information within the lifetime of this table on time.

This existing method of devices discovery adopts maximum 65,334 devices online and the maximum of time consuming is shortened from 4 hours to 10 minutes. For the network in the substation, the effective range of this method is more than sufficient. There does not exist the phenomenon of "devices loss".

The performance comparison between an embodiment of the present disclosure and the existing solution is represented in the following table.

|  | Existing solution | The present disclosure |
|---|---|---|
| Subnet mask | 255.255.0.0, | 255.255.0.0, |
| Ping amount IPs | 256 * 256 − 2 = 65,334 | 256 * 256 − 2 = 65,334 |
| time-consuming | >= 4 hours | Max 10 mins |
| devices discovery loss | YES | NO |

Evidently, the embodiment of the present disclosure has dramatically increased the efficiency and meanwhile no phenomenon of the "devices loss" appears.

With the development of intellectualization for the substation, the types of IEDs and the switches used in the network of substation are more and more various. This situation has brought a great problem to the mission of fault location. So far, there is no product has ability of device identification.

Additionally, the system can provide an entire functionality of identification for the major and interesting devices in the network of substation, including host computers, IEDs, switches and the time source devices. The system can support at least one of the text descriptions and the graphic presentation of devices identification information. The system can use one or more methods and protocols to implement the process of devices identification.

In some embodiments, for the IEDs which have been configured in the system, the system can obtain the relevant information from the Substation Configuration Description (SCD) file, including technical key, IED series type, manufacturer, IP address, MAC address, Generic Object Oriented Substation Event (GOOSE) and Sample Value (SV) information. For the other devices which have not been configured in the system, the system will query the MAC address table offered by IEEE committee to identify the device name, the manufacturer, the IP address and the MAC address.

In some embodiments, the system can determine the host computer identification by using the SNMP protocol. For example, the system can obtain the relevant information from the Management Information Base (MIB) in the host computers with the specific Object Identifier (OID), including mainboard configuration, Central Processing Unit (CPU) load, memory occupancy, and operation system etc. The system can obtain the manufacturer, the MAC address, the IP address information of the host computers.

In some embodiments, the system can determine the switch identification by using the SNMP protocol. For example, the system can obtain the relevant information from the MIB in the switch by the specific OID, including the product name, type, manufacturer, IP address and the MAC address. Some types of switches support a common public OID, but some manufacturers only support the private OID. The system can not only support identification of all switches which support the common public OID, but also some switches which support the private OID.

In some embodiments, the system can determine identification information for time source devices. For the time source devices that only support the SNTP protocol, the system will send the clock synchronous request to the network of substation. If the value of time source in the response massage is not local, but is Global Positioning System (GPS) or others, the system will consider this device as a time source. For the time source devices which support the IEEE 1588 Precision Clock Synchronization Protocol, the system will capture the PTP announce packet in the network. After parsing the message, the system can obtain the MAC address of the device of time source, the type of master time source. Referring to the MAC address table offered by IEEE committee, the system can obtain the relevant information, including the manufacturer, MAC address and the IP address.

Returning to FIG. 2, at block 204, the system can determine an inter-device connection relationship of the plurality of devices.

Figure 3B:
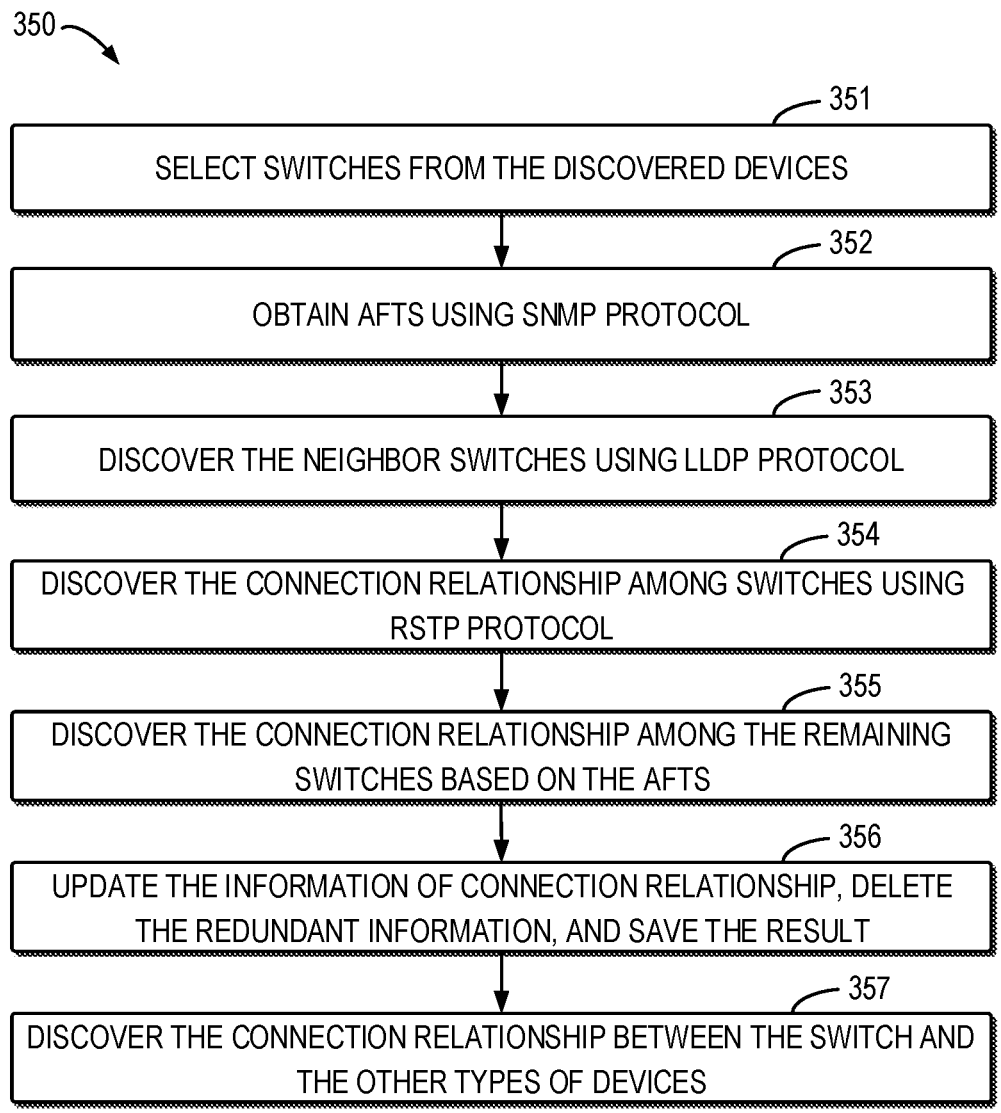
FIG. 3B is a flowchart illustrating a method of device discovery in a substation in accordance with embodiments of the present disclosure.

FIG. 3B is a flowchart illustrating a method 350 of determining an inter-device connection relationship of the devices.

At block 351, the system can select the switches from the discovered devices list. The system can distinguish the switches from the discovered devices according to the proper property such as Network Bridge. Using the SNMP protocol, the system can get the bridge network property information from the MIB in the switch with the OID 2.17.1.1.0. However, for the common final devices, e.g. like IEDs, using this OID cannot get any information. That means if the system send "Get" request with the OID 2.17.1.1.0 to a certain common final device, the response received by the system will be null. As a consequence, the switches can be selected from the discovered devices list.

At block 352, the system can obtain the AFTs (Address Forwarding Table) and relevant information. Using SNMP protocol, the system can obtain the completed AFT (Address Forwarding Table), the number of ports and the status of ports. The AFT contains all the destination MAC addresses, although there exits redundancy. For example, if port 1 of switch 1 is connected to port 2 of switch 2, the AFT of switch 1 contains not only the MAC address of the port 2 of switch 2, but also contains all the MAC addresses of the other ports of switch 2. The following steps can remove the redundant MAC addresses and obtain the accurate port-to-port connection relationship information.

At block 353, the system can discover the neighbor switches by using LLDP protocol. If the switch supports LLDP protocol, the system can obtain the connection relationship information from the MIB in the current switch by the specific OID, including IP address, MAC address and the ports which are connected between the current switch and its neighbor switches.

At block 354, the system can discover the connection relationship among switches by using RSTP protocol. If the switch does not support the LLDP protocol, the system will use the RSTP protocol to discover the connection relationship among the switch. Using the RSTP protocol, the system can obtain the STP table from the MIB in the current switch by the specific OID. Then the system can be aware of the root bridge port, the trunk ports and the blocking port. At last, the system can discover the connection relationship among the switches.

At block 355, the system can discover the connection relationship among the remaining switches based on the AFTs. For example, the system can use an AFT-based method to discover the connection relationship among the remaining switches and delete the redundant information in the Address Forwarding Table obtained from block 352.

In the AFT-based method, the system first obtains all the AFTs of the switches. Then, the system can review the status of ports and find out the ports that are connected to the other switch. The system can intersect the AFT of each switch with the AFTs of other switches one by one, and find out the switches which are directly connected.

At block 356, the system can update the information of connection relationship, delete the redundant information, and save the result.

At block 357, the system can discover the connection relationship between the switch and the other types of devices. By comparing the MAC address table of the discovered devices with the AFTs of switches, the system can discover the connection relationship between the switch and the devices of other types.

Returning to FIG. 2, at block 206, the system can generate a layout view for the plurality of devices based on the inter-device connection relationship. The layout view comprising a host computer layer comprising representations of the host computers, a switch layer comprising bus lines representing the switches, and an end device layer comprising representations of the end devices. Each of the host computer layer and the end device layer is connected to the switch layer.

Figure 4:
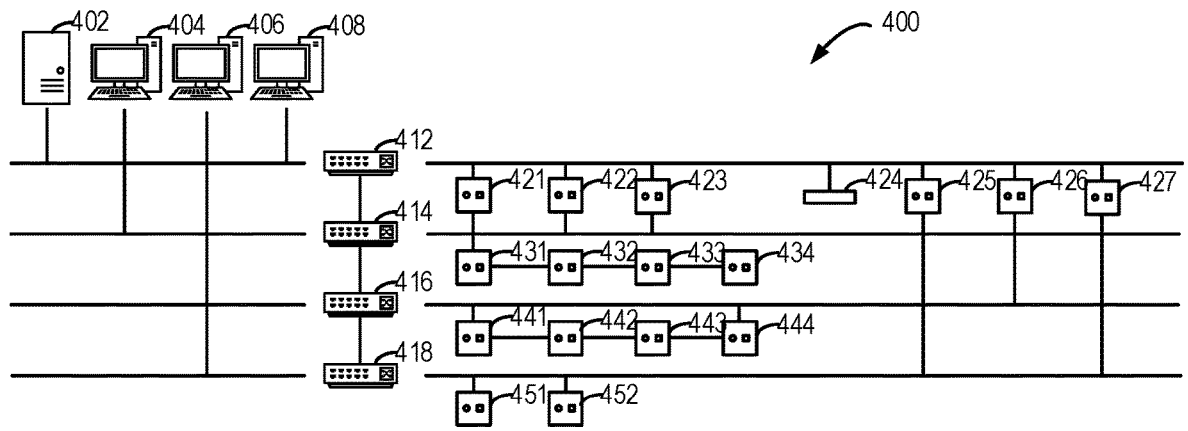
FIG. 4 shows a layout view of a substation in accordance with embodiments of the present disclosure.

FIG. 4 shows an illustrative layout view including host computers 402-406, switches 412-418, and end devices 421-452. The switch layer includes horizontal bus lines representing the switches 412-418 and the host computers 402-408 and the end devices 421-452 are connected to the bus lines.

The existing layout view becomes more and more complex and unclear with the augmentation of the devices and the connection relationship. However, the three-layer layout can make the layout of the devices more clearly, even if the number of the devices substantially increases.

In some embodiments, an optimization method is proposed in order to reduce the connection lines as much as possible and avoid the phenomenon of the cross connection lines. For example, the system can determine a first plurality of permutations of the switches that minimizes a total length of connection lines between the switches and the end devices. Then, the system can determine, from the first plurality of permutations of the switches, a second plurality of permutations of the switches that minimizes a total length of connection lines between the switches based on the first permutation of the switches. The system can then determine, from second plurality of permutations of the switches, a third permutation of the switches that minimizes a total length of connection lines between the host computers and the switches based on the second permutation of the switches. The third permutation of the switches can be used to generate the layout view.

For example, the first objective is to search the optimal layout which makes the total length of connection lines in the final device layer is the shortest. The kind of switch layout influences directly the length and the complexity of the connection lines between the final device and the switch bus line. For the reason that the amount of the final devices is the largest in the network of substation, the connection relationship in this layer is the most complex. Therefore, the first objective is to search a most optimal combination of switches so that the total length of connection lines in the final device layer is the shortest.

In some embodiment, the process of calculation is descripted as below.

Step 1. Assume the distance from a certain device to its closest neighbor switch(s) as the unit length with the value 1. For example, the distance between the IED 421 and switch 412 is a unit length. So if a certain TED traverses another switch bus line, and connect to a further switch line, the length of connection line is 1×3=3.

Step 2. Make full permutation of the switches and calculate the total length of the connection lines in the final device layer under the each kind of combination of the switches.

The amount of the combinations of the switch is:

CombineCnt$_{switch}$=Cnt$_{switch}$!

CombineCn$_{switch}$ represents the amount of the combinations of the switch, Cnt$_{switch}$ represents the amount of switches, and the symbol "!" means the operation of factorial. For example, 4!=4×3×2×1=24.

The total length of the connection lines in the final device layer is:

$$TOTLength_{finalLayer} = \sum_{1}^{N_{device}} Length_{device}$$

TOTLength$_{finalLayer}$ represents the total length of the connection lines in the final device layer, Length$_{device}$ represents the length of the connection lines between the device and its corresponding switch, and N$_{device}$ represents the number of the devices.

For the CombineCnt$_{switch}$ combinations of switches, all the values of total length of the connection lines in the final device layer can be represented as:

Array$_{finalLayer}$=[TOTLength_1$_{finalLayer}$, TOTLength_2$_{finalLayer}$ . . . ,TOTLength_n$_{finalLayer}$]

Array$_{finalLayer}$ represents the array of the total length of the connection lines in the final device layer with all the combinations of switches. TOTLength_n$_{finalLayer}$ represents the total length of the connection lines in the final device layer with the n combinations of switches.

Step 3. Select the combinations of switches which make the total length of the connection lines in the final device layer is the shortest.

The second objective is to search the optimal layout which makes the total length of connection lines in the switch layer is the shortest. Among the combinations of switches obtained by achieving the first objective, it is desired to search the optimal layout which makes the total length of connection lines in the switch layer is the shortest. The detailed process of calculation is as below:

Step 1. By using the same calculation method as the step 1 of the process of achieving the first objective, assume the distance between the neighbor switches as the unit length with the value 1, so the distance between the first switch and the third switch is 1×2=2, if these two switches are connected to each other. For example, the distance between the switch 412 and the switch 416 is two unit lengths and the distance between the switch 412 and the switch 414 is one unit length.

Step 2. Calculate the total length of the connection line in the switch layer under each switch combination obtained from the process of achieving the 1st objective.

The total length of the connection lines in the switch layer is:

$$TOTLength_{switchLayer} = \sum_{1}^{N_{switch}} Length_{switch}$$

TOTLength$_{switchLayer}$ represents the total length of the connection lines in the switch layer, Length$_{switch}$ represents the length of the connection lines between the device and its corresponding switch, and N$_{switch}$ represents the number of the devices.

For the CombineCnt$_{switch}$ combinations of switches, all the values of total length of the connection lines in the switch layer can be represented as:

Array$_{switchLayer}$=[TOTLength_1$_{switchLayer}$, TOTLength_2$_{switchLayer}$ . . . ,TOTLength_n$_{switchLayer}$]

Array$_{switchLayer}$ represents the array of the total length of the connection lines in the switch layer with all the combinations of switches.

TOTLength_n$_{switchLayer}$ represents the total length of the connection lines in the switch layer with the n combinations of switches.

Step 3 select the combinations of switches which make the total length of the connection lines in the switch layer is the shortest.

The third objective is to search the optimal layout which makes the total length of connection lines in the host computer layer is the shortest. Among the combinations of switches obtained after the above process of achieving the second objective, it is desired to search the optimal layout which makes the total length of connection lines in the host computer layer is the shortest. The detailed process of calculation is as below:

Step 1. Using the same calculation method as the step 1 of the process of achieving the 1st objective, assume the distance between the host computer and the 2nd nearest switch as the unit length with the value 1, so the distance between the host computer and the 4th switch is 1×3=3, if this host computer and this switch are connected to each other. For example, the distance between the host computer 404 and the switch 414 is a unit length and the distance between the host computer 406 and the switch 418 is three unit lengths.

Step 2. Calculate the total length of the connection line in the host computer layer under each switch combinations obtained from the process of achieving the second objective.

The total length of the connection lines in the host computer layer is:

$$TOTLength_{PCLayer} = \sum_{1}^{N_{PC}} Length_{PC}$$

$TOTLength_{PCLayer}$ represents the total length of the connection lines in the host computer layer.

$Length_{PC}$ represents the length of the connection lines between the device and its corresponding switch.

$N_{PC}$ represents the number of the devices.

For the $CombineCnt_{switch}$ combinations of switches, all the values of total length of the connection lines in the host computer layer can be represented as:

$Array_{PCLayer}$=[TOTLength_1$_{PCLayer}$, TOTLength_2$_{PCLayer}$, . . . ,TOTLength_n$_{PCLayer}$]

$Array_{PCLayer}$ represents the array of the total length of the connection lines in the host computer layer with all the combinations of switches.

$TOTLength\_n_{PCLayer}$ represents the total length of the connection lines in the host computer layer with the n combination of switches.

Step 3. Select the combinations of switches which make the total length of the connection lines in the host computer layer is the shortest. In fact, two most optimal combinations of switches can be obtained. The 2 combinations are inverse symmetrically, for example, the first combination is switch 1, switch 3, switch 4, switch 2; the second one is switch 2, switch 4, switch 3, switch 1. In principle, any of the combination can be as the result. However, in order to adapt the visual habits, the combination whose the first switch has the more final devices can be selected as the final optimal result.

The time-consuming of the full permutation method will augment exponentially with the augmentation of the number of the elements. The test indicates that the time-consuming of the full permutation is approximately 0.7 second if the number of switches is 7, but this value augments to 4 hours when the number of switches is 10.

Therefore, in order to compromise with the time-consuming, the switches can be separated into two groups when the number of switches is beyond 7. Each group is made the full permutation and is applied the optimization method above. Then, two groups of the optimal combinations of switches can be obtained. Then, the full permutation can be applied to the two groups of the optimal combinations, and the most optimal combination of switches can be obtained. The maximal time consumed for 14 switches is about 4 seconds. If the number of the switches further increases, the switches can be separated into more than two groups.

Figure 5:
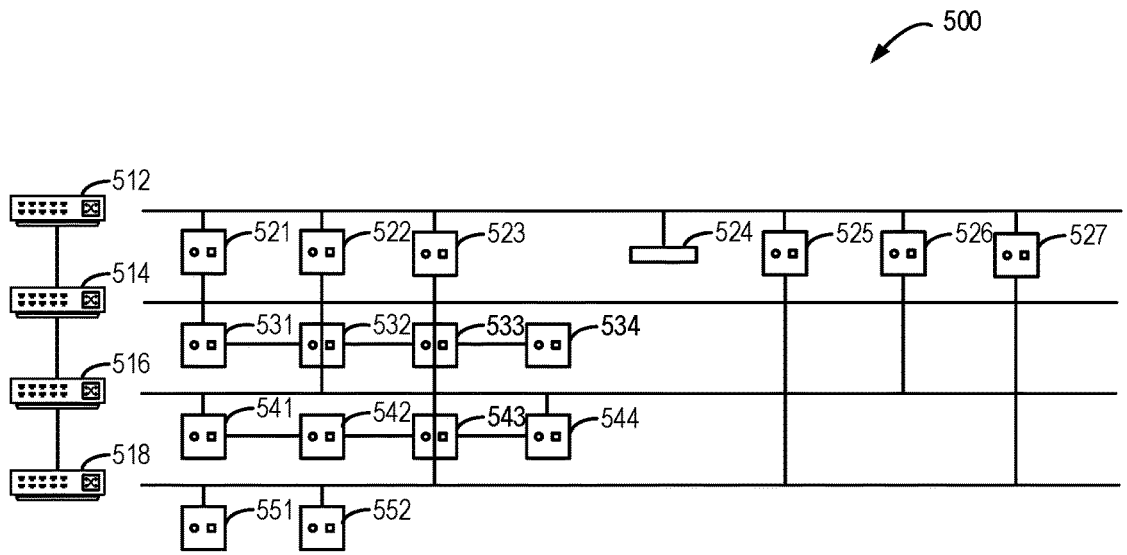
FIG. 5 shows a portion of a layout view of a substation in accordance with embodiments of the present disclosure.

In some embodiments, the connection lines of the specific IEDs may traverse the other IEDs. As shown in FIG. 5, a connection line of the IED 522 traverses the IED 532, and a connection line of the IED 523 traverses the IEDs 533 and 543. This illustration may cause confusion and difficulties for viewers.

In some embodiments, if it is determined that a connection line for a first end device traverses at least one of other devices, moving the representation of the first end device along the bus line such that the connection line does not traverse any of other devices. For example, a method named "virtual lattice" is proposed to regular the position of the final device so that the generated final optimal layout can avoid thoroughly the situation mentioned above.

Figure 6:
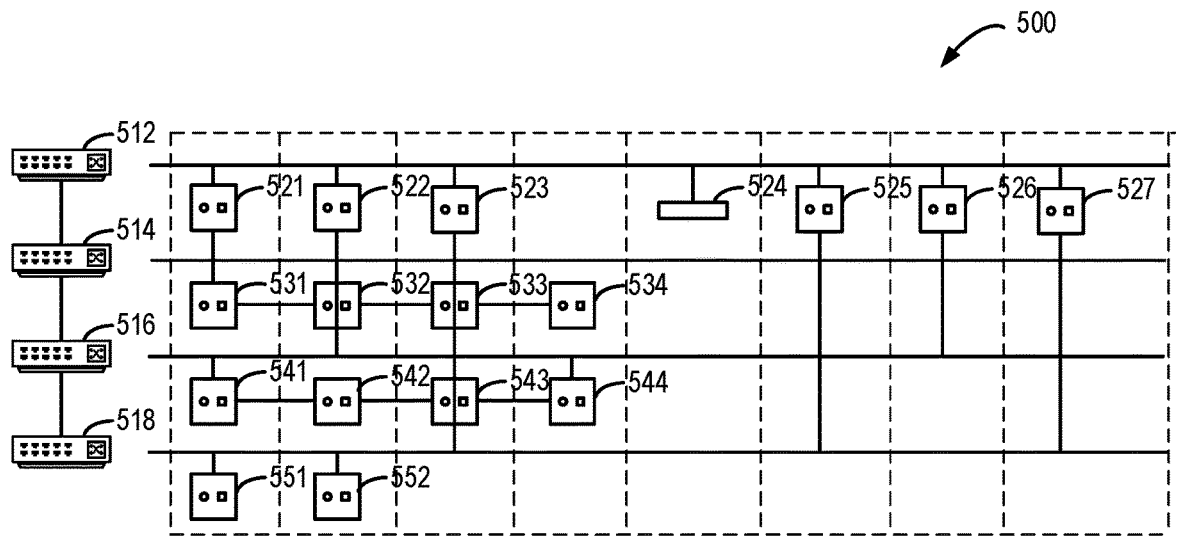
FIG. 6 shows a portion of a layout view of a substation in accordance with embodiments of the present disclosure, in which virtual lattices are shown.

Step 1. Generate a virtual lattice which can contain completely the zone of the final device layer, as shown FIG. 6. For example, the virtual lattice can be generated in the memory and not displayed on the interface. The size of each cell is the same and can contain completely the device and/or the connection line.

Step 2. If a certain cell is filled with the device or the connection line, this cell will be noted with True. If the cell is null, it will be noted with False.

Step 3. Move horizontally the objective device to the right. Each time, move by one cell, and then judge the status of the current cell which the objective device is in and the status of the cells which are traversed by the connection lines of the objective device, are noted with True or False. If all these status are False, the process of movement will stop, and the objective device is fixed at the best position where no other device is traversed by the connection lines of the objective device. If not, continue to move the objective device to the next cell, and repeat the judgment above until find out the best position.

Figure 7:
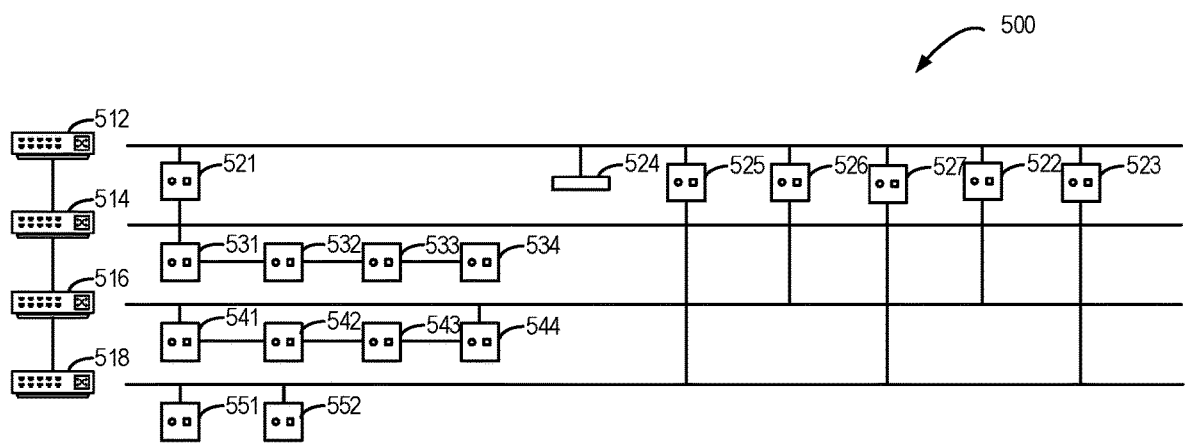
FIG. 7 shows a portion of a layout view of a substation in accordance with embodiments of the present disclosure.

Step 4. If the objective device has been moved at the border of the current view and still there is no suitable position, the view will add automatically a new column which all the cells of this column are null, and simultaneously, the "virtual lattice" will add automatically a new null column. Because the new added column is null, it can adapt the objective device, as shown in FIG. 7. For example, the devices 522 and 523 are moved to the new added columns.

The system can identify the PC, switch, time source and IEDs. The IP address can serve as the label of devices. An icon of the device may be also displayed, such as a picture of its type. The identification and/or connectivity information can also be shown on the interface, or can be shown in response to an operation on the interface. In this way, the display can be informative and indicative to the users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining a plurality of devices in a networked state in a substation system, the plurality of devices comprising host computers, switches, and end devices, the substation system comprising a plurality of network addresses;
    determining an inter-device connection relationship of the plurality of devices; and
    generating a layout view for the plurality of devices based on the inter-device connection relationship, the layout view comprising a host computer layer comprising representations of the host computers, a switch layer comprising bus lines representing the switches, and an end device layer comprising representations of the end devices, each of the host computer layer and the end device layer being connected to the switch layer, wherein determining the plurality of devices comprises:
sending a first echo request to each network address of the plurality of network addresses;
in response to receiving a first response to the first echo request from a first device, sending a second echo request to each network address in a network segment comprising the first device; and
in response to receiving a second response to the second echo request from a second device in the network segment, determining the second device as one of the plurality of devices.

2. The method of claim 1, wherein the end devices comprise at least one of an Intelligent Electronic Device (IED) or a time source device.

3. The method of claim 1, wherein determining the plurality of devices further comprises:
in response to failing to receive the second response to the second echo request from a network address in the network segment, sending a socket client-server connecting request to the network address in the network segment; and
in response to receiving a third response to the socket client-server connecting request from a third device, determining the third device as one of the plurality of devices.

4. The method of claim 1, further comprising:
obtaining identification information for the plurality of devices,
wherein the layout view comprises a representation of the identification information.

5. The method of claim 4, wherein the end devices comprise an Intelligent Electronic Device (IED) and a time source device, and
wherein obtaining the identification information comprises:
determining the identification information for the IED based on at least one of a Substation Configuration Description (SCD) file or an IEEE Medium Access Control (MAC) address table; and
determining the identification information for the time source device based on at least one of a Simple Network Time Protocol (SNTP) protocol or an IEEE 1588 protocol.

6. The method of claim 4, wherein obtaining the identification information comprises:
determining the identification information for the host computers and switches based on a Simple Network Management Protocol (SNMP) protocol.

7. The method of claim 1, wherein determining the inter-device connection relationship comprises:
determining a first connection relationship among the switches in the plurality of devices as a part of the inter-device connection relationship; and
determining, based on an IEEE Medium Access Control (MAC) address table and Address Forwarding Tables (AFTs) for the switches, a second connection relationship between the switches and remaining devices comprised in the plurality of devices as a further part of the inter-device connection relationship.

8. The method of claim 7, wherein determining the first connection relationship among the switches comprises:
discovering one or more neighbor switches from the switches based on at least one of a discovery protocol or a Rapid Spanning Tree Protocol (RSTP) protocol;
obtaining the AFTs for the switches based on a Simple Network Management Protocol (SNMP) protocol; and
discovering a connection relationship among other switches based on the AFTs.

9. The method of claim 1, wherein generating the layout view comprises:
determining a first plurality of permutations of the switches that minimizes a total length of connection lines between the switches and the end devices;
determining, from the first plurality of permutations of the switches, a second plurality of permutations of the switches that minimizes a total length of connection lines between the switches based on the first permutation of the switches;
determining, from the second plurality of permutations of the switches, a third permutation of the switches that minimizes a total length of connection lines between the host computers and the switches based on the second permutation of the switches; and
generating the layout view based on the third permutation of the switches.

10. The method of claim 1, wherein generating the layout view comprises:
in response to a connection line for a first end device of the end devices traversing through at least one other device of the plurality of devices, moving a representation of the first end device along a respective bus line of the bus lines such that the connection line does not traverse the at least one other device.

11. A computer-readable storage medium storing instructions which, when executed by a computing device, cause the computing device to perform the method of claim 1.

12. A computing device, comprising:
a processor; and
a computer-readable storage medium storing instructions which, when executed by the processor, cause the processor to perform a method comprising:
determining a plurality of devices in a networked state in a substation system, the plurality of devices comprising host computers, switches, and end devices, the substation system comprising a plurality of network addresses;
determining an inter-device connection relationship of the plurality of devices; and
generating a layout view for the plurality of devices based on the inter-device connection relationship, the layout view comprising a host computer layer comprising representations of the host computers, a switch layer comprising bus lines representing the switches, and an end device layer comprising representations of the end devices, each of the host computer layer and the end device layer being connected to the switch layer,
wherein determining the plurality of devices comprises:
sending a first echo request to each network address of the plurality of network addresses;
in response to receiving a first response to the first echo request from a first device, sending a second echo request to each network address in a network segment comprising the first device; and
in response to receiving a second response to the second echo request from a second device in the network segment, determining the second device as one of the plurality of devices.

13. A substation, comprising:
host computers;
switches coupled to the host computers;
end devices coupled to the switches; and
a computing device comprising:
　a processor; and
　a computer-readable storage medium storing instructions which, when executed by the processor, cause the processor to perform a method comprising:
　　determining a plurality of devices in a networked state in a substation system, the plurality of devices comprising host computers, switches, and end devices, the substation system comprising a plurality of network addresses;
　　determining an inter-device connection relationship of the plurality of devices; and
　　generating a layout view for the plurality of devices based on the inter-device connection relationship, the layout view comprising a host computer layer comprising representations of the host computers, a switch layer comprising bus lines representing the switches, and an end device layer comprising representations of the end devices, each of the host computer layer and the end device layer being connected to the switch layer,
wherein determining the plurality of devices comprises:
　sending a first echo request to each network address of the plurality of network addresses;
　in response to receiving a first response to the first echo request from a first device, sending a second echo request to each network address in a network segment comprising the first device; and
　in response to receiving a second response to the second echo request from a second device in the network segment, determining the second device as one of the plurality of devices.

14. A method, comprising:
determining a plurality of devices in a networked state in a substation system, the plurality of devices comprising host computers, switches, and end devices;
determining an inter-device connection relationship of the plurality of devices; and
generating a layout view for the plurality of devices based on the inter-device connection relationship, the layout view comprising a host computer layer comprising representations of the host computers, a switch layer comprising bus lines representing the switches, and an end device layer comprising representations of the end devices, each of the host computer layer and the end device layer being connected to the switch layer,
wherein generating the layout view comprises:
　in response to a connection line for a first end device of the end devices traversing through at least one other device of the plurality of devices, moving a representation of the first end device along a respective bus line of the bus lines such that the connection line does not traverse the at least one other device.

* * * * *